United States Patent

Kim et al.

[11] Patent Number: 6,144,434
[45] Date of Patent: Nov. 7, 2000

[54] HOMEOTROPIC MULTI-DOMAIN

[75] Inventors: Hyang Yul Kim; Seung Hee Lee, both of Kyoungki-do, Rep. of Korea

[73] Assignee: Hyundai Electronics Industries Co., Ltd., Kyoungki-do, Rep. of Korea

[21] Appl. No.: 09/307,658

[22] Filed: May 10, 1999

[30] Foreign Application Priority Data

May 29, 1998 [KR]  Rep. of Korea ............. 98-19610

[51] Int. Cl.$^7$ .................. G02F 1/1337; G02F 1/1343
[52] U.S. Cl. ............................. 349/130; 349/139
[58] Field of Search ........................ 349/130, 139, 349/143, 141

[56] References Cited

U.S. PATENT DOCUMENTS

| | | | |
|---|---|---|---|
| 4,978,916 | 12/1990 | Combettes et al. | 324/212 |
| 5,412,561 | 5/1995 | Rosenshein et al. | 364/413 |
| 5,710,611 | 1/1998 | Suzuki et al. | 349/129 |
| 5,745,206 | 4/1998 | Koike et al. | 349/129 |
| 5,852,485 | 12/1998 | Shimada et al. | 349/141 |
| 5,946,060 | 8/1999 | Nishiki et al. | 349/48 |
| 5,963,290 | 10/1999 | Murai et al. | 349/191 |
| 5,969,781 | 10/1999 | Matsuyama et al. | 349/130 |

OTHER PUBLICATIONS

Lien et al "Ridge and Fringe–Field Multi–Domain Homeotropic LCD" SID 98 Digest, May 1998.
Konovalov et al "Multi–Domain Vertically Aligned Mode" SID 98 Digest, May 1998.

Primary Examiner—James A. Dudek
Attorney, Agent, or Firm—Ladas & Parry

[57] ABSTRACT

A liquid crystal display of homeotropic alignment mode having a multi-domain comprising: an upper and a lower substrates opposing each other with a selected cell gap; a liquid crystal layer sandwiched between said substrates and composed of a plurality of liquid crystal molecules; a first driving electrode and a second driving electrode both extended in parallel in a first direction and formed at inner surface of the lower substrate with a selected distance; and a third driving electrode and a fourth driving electrode both extended in parallel in a second direction which is substantially perpendicular to the first direction and both formed at inner surface of the upper substrate with a selected distance, wherein long axes of the liquid crystal molecules are arranged perpendicular to the substrates in the absence of electric field between the electrodes, and in the presence of electric field, the long axes of the liquid crystal molecules are tilted with respect to the center of the electric field so that the long axes of the liquid crystal molecules are arranged parallel to the electric field, wherein the cell gap is smaller than the distances between the first electrode and the second electrode and between the third electrode and the fourth electrode, and wherein an equivalent voltage is applied to the first and the third electrodes, however the voltage applied to the second and the fourth electrodes has voltage difference with the voltage applied to the first electrode.

17 Claims, 13 Drawing Sheets

A1  P1

V=6V

V=9V

V=14V

P2

V=6V

V=9V

80

V=14V

80

HOMEOTROPIC MULTI-DOMAIN

BACKGROUND OF THE INVENTION

The present invention relates to a liquid crystal display device(hereinafter "LCD"), more particularly to a liquid crystal display of homeotropic alignment mode having multi-domain.

Currently, a twisted nematic mode(hereinafter "TN mode") LCD used in the notebook computers and other display devices, has high optical efficiency and stability in operation.

However, the TN mode LCDs has the intrinsic property of narrow viewing angle.

Consequently, an In-Plane Switching mode(hereinafter "IPS") LCD in which liquid crystal is driven by an electric field being formed parallel to substrates, has been suggested by Hitachi, a corporation of Japan so as to solve the narrow viewing angle characteristics.

However, the IPS mode LCD also has a drawback that a color shift is generated according to the viewing directions, i.e. the azimuth angles.

So as to eliminate the color shift occurrence, an LCD device capable of maintaining wide viewing angle and simultaneously eliminating the color shift, has been suggested by the present inventors. (U.S. Ser. No. 09/107,797)

Referring to FIG. 1a, a conventional LCD will be described. An upper substrate 10 and a lower substrate 20 are opposed each other with a selected distance d1(hereinafter "cell gap") and a liquid crystal layer 30 is formed between the two substrates 10 and 20. A first driving electrode 21 and a second driving electrode 22, the two electrodes 21,22 for driving molecules 30A in the liquid crystal layer 30 (hereinafter "LC molecules") are formed at the lower substrate 20. Both electrodes 21 and 22 are arranged parallel each other in an x direction shown in the drawings.

A third driving electrode 11 and a fourth driving electrode 12 are formed at one side of the upper substrate 10 which faces the liquid crystal, both electrodes 11 and 12 are formed in parallel each other in a y direction which is substantially perpendicular to the x direction. Herein, a distance l1 between the first driving electrode 21 and the second driving electrode 22, and a distance l2 between the third driving electrode 11 and the fourth driving electrode 12 are equal or almost equal to each other. Further the distances l1 and l2 are designed to be larger than the cell gap d1.

The LC molecules of the liquid crystal layer 30 has a positive dielectric anisotropy. Long axes of the respective LC molecules are arranged in parallel to the electric field direction when an electric field is applied.

Alignment layers(not shown) for determining the initial aligning state of the LC molecules 30A are formed at an inner surface of the upper and the lower substrates 10 and 20. Herein, the alignment layer is a homeotropic layer at a pretilt angle of 85°–90°.

A polarizer 23 is attached to an outer surface of the lower substrate 20 and an analyzer 13 is attached to an outer surface of the upper substrate 10. Polarizing axis of the polarizer 23 is arranged in a "P" direction which is deviated from the electric field generated between the first and the second electrodes by approximately 45° preferably, and polarizing axis of the analyzer 13 is arranged in an "A" direction which is perpendicular to the "P" direction.

In order to compensate the refractive anisotropy of LC molecules, a phase compensation film 14 is sandwiched between the upper substrate 10 and the analyzer 13.

As shown in FIG. 1a, when no electric field is formed at the electrodes 11,12,21,22 of the above described arrangements, long axes of the respective LC molecules are arranged perpendicular to the upper substrate 10 and the lower substrate 20 according to the influence of the homeotropic alignment layer (not shown). Consequently, an incident light to pass the polarizer 23, hardly passes the analyzer 13 since said light does not change its polarizing state while passing the liquid crystal layer 30 and therefore the screen becomes dark. At this time, the refractive anisotropy of LC molecules 30A is compensated by the phase compensation film 14 and then a complete dark state is achieved at all points in the screen.

On the other hand, when a voltage is applied to the electrodes 11,12,21,22, an electric field F1 is formed between the first and the second electrodes 11 and 12, and an electric field F2 is formed between the third and the fourth electrodes 21 and 22. At this time, the respective electric fields F1 and F2 are in parallel with surfaces of the substrates 10 and 20 at regions adjacent to the substrates, and the electric fields become an elliptic shape as they recede from the substrates 10 and 20, i.e. as they approach a middle layer of the liquid crystal layer 30. Accordingly, the entire structure of the electric fields F1 and F2 has the shape of an ellipse being twisted by 90° with respect to the middle layer. Herein, the cell gap d1 should be larger than the distances l1 and l2 between the electrodes, and therefore electric fields F1, F2 in parallel to the substrates 10,12 are formed respectively.

The LC molecules 30A arranged perpendicular to the substrates are tilted in the form of the electric fields F1 and F2, and a light leakage is occurred. Herein, the LC molecules 30A are arranged symmetrically in every direction according to the 90° twisted electric-fields, and therefore a quadruple domain is formed without incurring additional rubbing process. The quadruple domain prevents the color shift occurrence and improves the viewing angle characteristics in LCDs.

However, the conventional LCD as described above still has following problems.

Generally, when the LCDs are set in horizontal level, their molecules are arranged symmetrically and no color shift is occurred at every azimuth angle. However when they are set obliquely, the color shift occurs.

More detailed description is given with reference to FIG. 2. When the LCD device is set obliquely, a viewer regards the entire electric field as set obliquely. Consequently, the arrangement of LC molecules seems to be asymmetric and the cell gap d2 seems to be enlarged. Furthermore, factors of the refractive anisotropy Δn and cell gap d, both determining the color shift are variable and, which is resulted in the color shift occurrence.

In addition, the cell gap is enlarged since the LCD device is set obliquely and response time thereof is degraded. Therefore, the threshold voltage of the LCD device is increased according to the following equation 1.

$$Vth = \pi l / d (K2/\epsilon_0 \Delta \epsilon)^{1/2} \qquad \text{equation 1}$$

wherein,

Vth indicates threshold voltage, l indicates distance between electrodes, d indicates cell gap, K2 indicates twist elastic coefficient, $\epsilon^0$ indicates dielectric constant, and $\Delta_\epsilon$ indicates dielectric anisotropy.

As shown in the equation 1, the driving voltage of LCD device varies according to the value of l/d. As the cell gap increases, great quantity of driving voltage is required.

SUMMARY OF THE INVENTION

Accordingly, it is a general object of the present invention to prevent color shift occurrence although an LCD device is set obliquely.

It is another object of the present invention to improve response time of an LCD device.

It is further object of the present invention to provide an LCD device operating low driving voltage.

According to the object of the present invention, a liquid crystal display of homeotropic alignment mode having a multi-domain comprises: an upper and a lower substrates opposing each other with a selected cell gap; a liquid crystal layer sandwiched between said substrates and composed of a plurality of liquid crystal molecules; a first driving electrode and a second driving electrode both extended in parallel in a first direction and formed at inner surface of the lower substrate with a selected distance; and a third driving electrode and a fourth driving electrode both extended in parallel in a second direction which is substantially perpendicular to the first direction and both formed at inner surface of the upper substrate with a selected distance, wherein long axes of the liquid crystal molecules are arranged perpendicular to the substrates in the absence of electric field between the electrodes, and in the presence of electric field, the long axes of the liquid crystal molecules are tilted with respect to the center of the electric field so that the long axes of the liquid crystal molecules are arranged parallel to the electric field, wherein the cell gap is smaller than the distances between the first electrode and the second electrode and between the third electrode and the fourth electrode, and wherein an equivalent voltage is applied to the first and the third electrodes, however the voltage applied to the second and the fourth electrodes has voltage difference with the voltage applied to the first electrode.

The LCD according to the present invention, a liquid crystal display of homeotropic alignment mode having a multi-domain further comprises: an upper and a lower substrates opposing each other with a selected cell gap and defining a plurality of pixel areas opposing each other; a liquid crystal layer sandwiched between the substrates and composed of a plurality of liquid crystal molecules; a first driving electrode and a second driving electrode both formed at each unit pixel of the lower substrate with a selected distance in an alternative manner and extended in parallel in a first direction; a third driving electrode and a fourth driving electrode both formed at each unit pixel of the upper substrate with a selected distance and extended in parallel in a second direction which is substantially perpendicular to the first direction; homeotropic alignment layers formed at the inner surfaces of the lower substrate and the upper substrate respectively; a polarizer with polarizing axis formed at the outer surface of the lower substrate; an analyzer with polarizing axis which is substantially perpendicular to the polarizing axis of the polarizer, formed at the outer surface of the upper substrate; and a phase compensation film for showing the liquid crystal molecules to be isotropic and sandwiched between the upper substrate and the analyzer, wherein, an equivalent voltage is applied to the first and the third electrodes, however the voltage applied to the second and the fourth electrodes has voltage difference with the voltage applied to the first electrode, wherein, the cell gap is smaller than the distances between the first electrode and the second electrode and between the third electrode and the fourth electrode thereby generating electric fields between an intersection of the first and the third electrodes, and an intersection of the second and fourth electrodes, and wherein, the polarizing axis of the polarizer is coincide with said first direction or said second direction.

BRIEF DESCRIPTION OF DRAWINGS

FIGS. 6b to 6d are views for showing light transmittivity of the screen according to the voltage variation when the polarizer system is arranged same as FIG. 6a.

FIGS. 7b to 7d are views for showing light transmittivity of the screen according to the voltage variation when the polarizer system is arranged same as FIG. 7a.

DETAILED DESCRIPTION

Hereinafter, detailed description of an embodiment in the present invention is given with reference to the attached drawings.

In the present embodiment, a cell gap is formed smaller than the distances between electrodes thereby generating an effective field. Accordingly, the color shift is prevented although an LCD device is set obliquely, and the response time thereof is improved and also the LCD device enables operation under lower voltage condition.

Figure 1A:
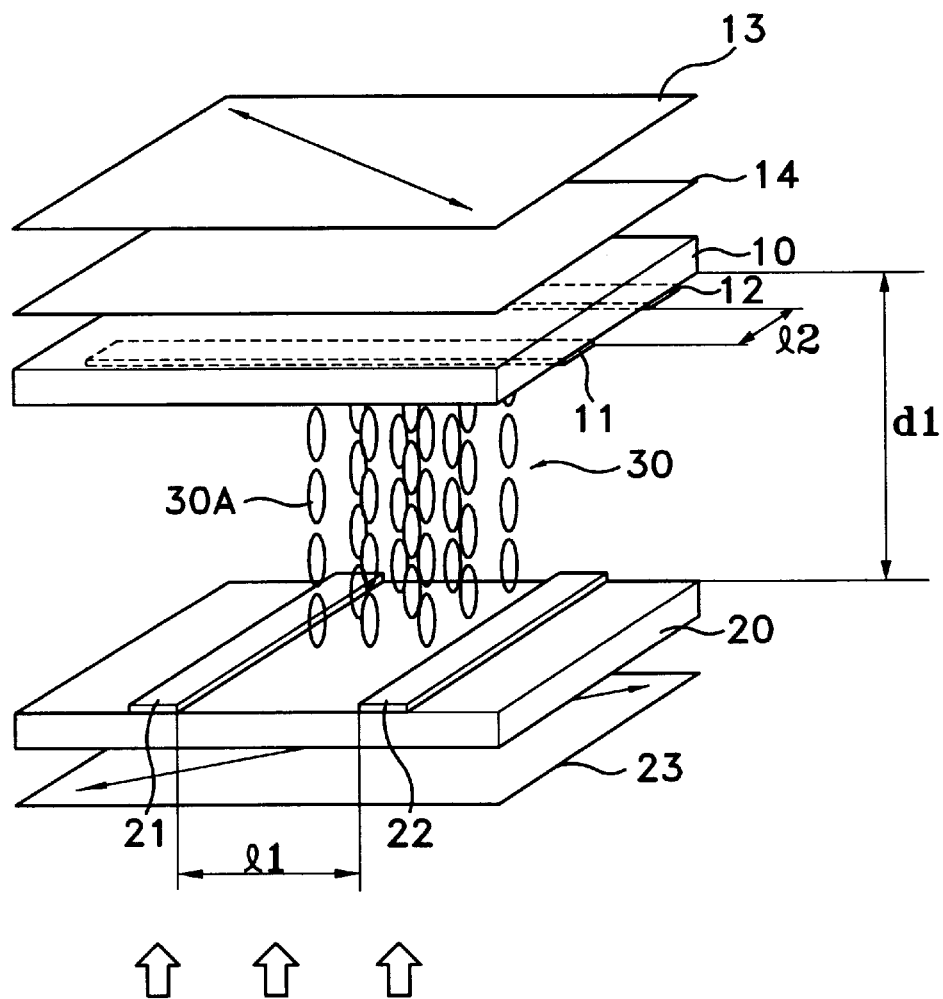
FIGS. 1a to 1b are perspective views for showing conventional LCD of homeotropic alignment mode having muti-domain.
Figure 1A:
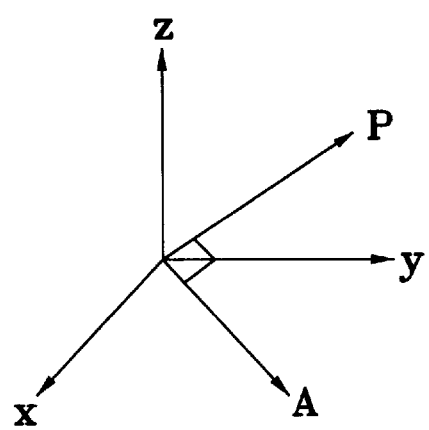
Figure 1B:
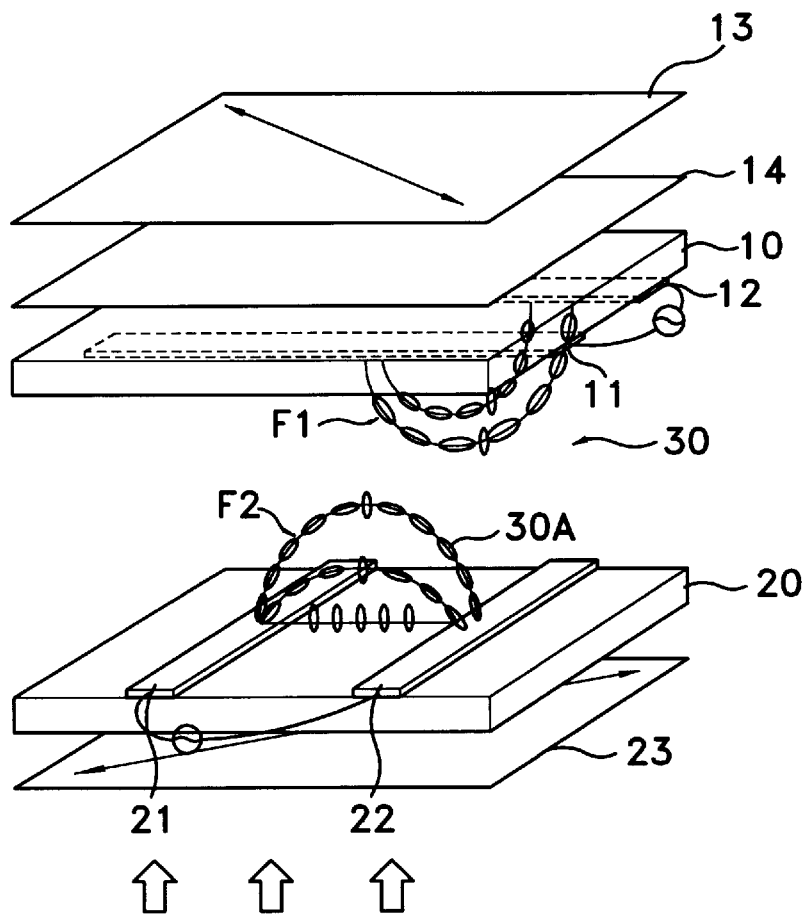
Figure 1B:
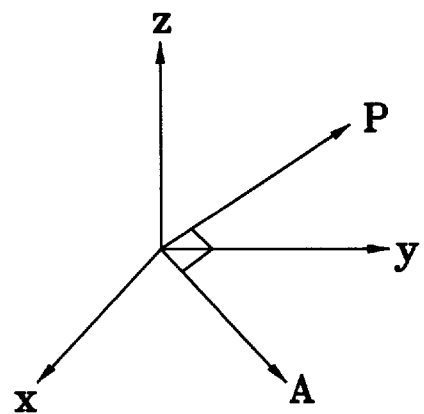
Figure 2:
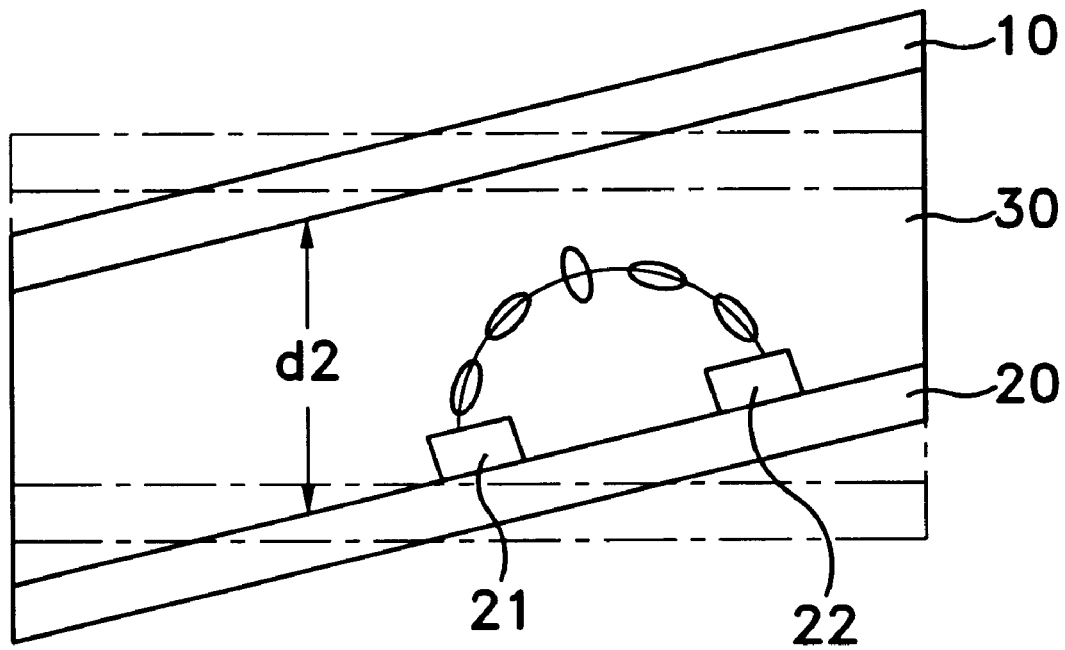
FIG. 2 is a planar view for showing conventional LCD of homeotropic alignment mode having multi-domain when the LCD is set obliquely.
Figure 3:
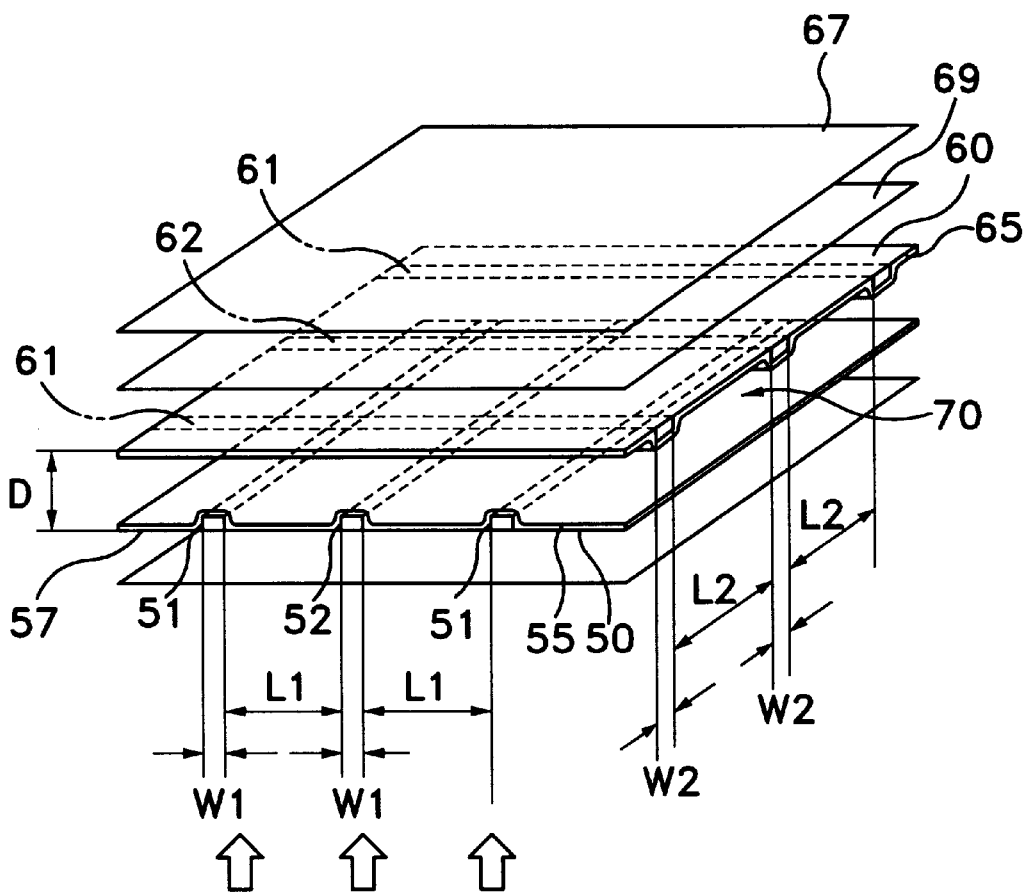
FIG. 3 is a perspective view for showing LCD of homeotropic alignment mode having multi-domain in accordance with the present invention.
Figure 3:
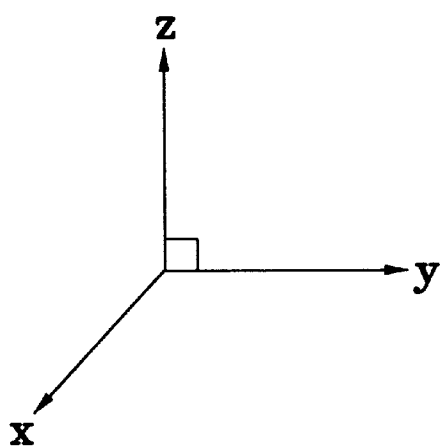

Referring to FIG. 3, a lower substrate 50 and an upper substrate 60 are opposed with a selected distance D. In the present embodiment, the distance D, i.e. cell gap is set in the range of 3–10 $\mu$m, preferably 5 $\mu$m. A liquid crystal layer 70 is sandwiched between the lower substrate 50 and the upper substrate 60, and the liquid crystal layer 70 is made of a material of positive dielectric anisotropy. The liquid crystal layer 70 is dielectric anisotropy $\Delta\epsilon$ of 7.4 and refractive anisotropy $\Delta$n of 0.088 at room temperature. Furthermore, the value of phase retardation in the present embodiment is set in the range of 0.2–0.7 $\mu$m, in this embodiment a unit pixel area is described for instance. Herein, the value of phase retardation is the product of refractive anisotropy Δn of LC molecules and the cell gap D.

A pair of first driving electrodes 51 is formed at inner surface of the lower substrate 50, and a second driving electrode 51 is formed between the first driving electrodes 51. The first electrode 51 and the second electrode 52 are in parallel in an x direction in the drawings, and both electrodes 51, 52 having a selected width of w1 are separated with a selected distance L1. Herein, the distance L1 between the first electrodes 51 and the second electrode 52 should be larger than the cell gap D and the widths w1. In the present embodiment, the distance L between the first electrode 51 and the second electrode 52 is set in the range of 5–25 μm and the width w1 is set in the range of 3–10 μm. The distance L1 between the first electrodes 51 and the second electrode 52 is preferably 20 μm and the width w1 is 10 μm.

A pair of third driving electrodes 61 is formed at inner surface of the upper substrate 60, and a fourth driving electrode 62 are formed between third driving electrodes 61. The third electrodes 61 and the fourth electrodes 62 are arranged in parallel in a y direction which is substantially perpendicular to the x direction. The third electrodes 61 and the fourth electrode 62 have a selected width w2 and they are also separated with a selected distance L2. Herein, the distance L2 between the third electrodes 61 and the fourth electrode 62 should be larger than the cell gap D. It is desirable that the distance L1 between the first and second electrodes 51,52 and the distance L2 between the third and fourth electrodes 61,62 are equal to each other. In the present embodiment, the distance L2 between third electrode 61 and fourth electrode 62 is set in the range of 5–20 μm and the width w2 thereof is set in the range of 3–10 μm. The distance L2 between the third electrodes 61 and the second electrode 62 is preferably 20 μm and the width w2 thereof is 10 μm.

An equivalent voltage is applied to the first and the third electrodes 51, 61, and another equivalent voltage is applied to the second and the fourth electrodes 52, 62 respectively. However, the voltage applied to the second and the fourth electrodes 52, 62 differs from the voltage applied to the first and the third electrodes 51,61.

Alignment layers 55, 65 are formed at the inner surfaces of the lower substrate 50 and the upper substrate 60 respectively. The respective alignment layers 55, 65 are homeotropic alignment layers in which long axes of the LC molecules are arranged almost perpendicular to the substrates 50, 60 prior to the formation of electric field.

A polarizer 57 for firstly polarizing an incident light transmitted from a light source is arranged at the outer surface of the lower substrate 50, and an analyzer 67 for secondly polarizing the incident light is arranged at the outer surface of the upper substrate 60. Herein, a polarizing axis of the polarizer 57 is arranged perpendicular to that of the analyzer 67, and the polarizer 57 is set in a first state or in a second state. In the first state, referring to FIG. 6a, the polarizing axis of the polarizer 57 is coincide with a "P1" direction having 45° with the x direction, and in the second state, referring to FIG. 7a, the polarizing axis of the polarizer 57 is coincide with a "P2" direction same as the x direction.

A phase compensation film 69 for compensating the anisotropic characteristics of LC molecules is sandwiched between the upper substrate 60 and the analyzer 67. The phase compensation film 69 is a polarizing material of negative refractive anisotropy, or is made of a cured film. Phase retardation value of the phase compensation film 69, i.e. the product of refractive anisotropy of LC molecules in the phase compensation film 69 and thickness of the phase compensation film, is equal to the absolute value of phase retardation of the liquid crystal layer 70, i.e. the product of refractive anisotropy of the LC molecules and the cell gap.

Hereinafter, operation of the LCD device according to the embodiment of the present invention will be followed.

If no voltage difference occurs between the respective electrodes 51, 52, 61 and 62, the screen becomes dark when the polarizing system, i.e. the arrangement of the polarizer and the analyzer becomes the first state or the second state. The reason is that the long axes P1,P2,A1,A2 of both polarizer and analyzer are intersected each other and the long axes of the LC molecules are arranged perpendicular to the substrate. A light to pass the polarizing axes P1,P2 also passes through the short axes of LC molecules 70A in the liquid crystal layer 70 and the light passed through the liquid crystal layer 70 does not change its polarizing state. Since the light to pass the liquid crystal layer 70 is unable to pass the polarizing axes A1,A2 of the analyzer which are intersected by the polarizing axes P1,P2. Then, the screen becomes dark.

Figure 4:
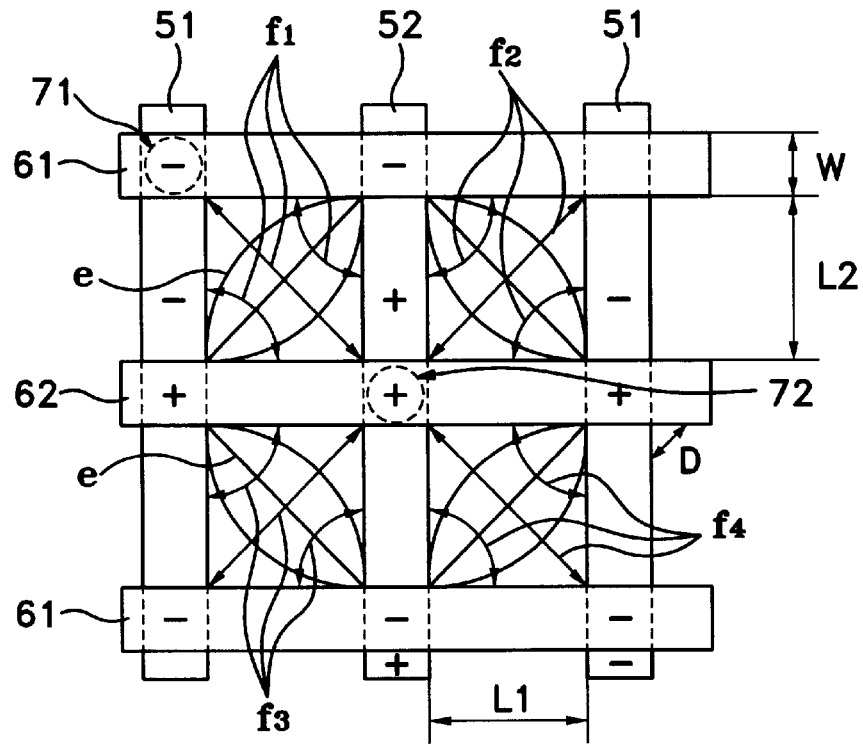
FIG. 4 is a planar view for showing electrodes arrangement of the present invention LCD.

On the other hand, as shown in FIG. 4, when a voltage is applied to the first and the third driving electrodes 51,61 and to the second and the fourth driving electrodes 52,62 respectively, electric fields f1–f4 are formed between the first and the third electrodes 51,61 and the second and the fourth electrodes 52,62 owing to the voltage difference. Herein, since the distances L1,L2 between the driving electrodes are narrower than the cell gap D, the electric fields f1–f4 are formed almost in an oblique line between an intersection 71 of the first electrode 51 and the third electrode 61, and an intersection 72 of the second electrode 52 and the fourth electrode 62. When the electric fields f1–f4 are projected into the substrate 50, the electric fields have the angle of 45° with the first and the second electrodes 51, 52. Herein, the reference "e" shown in a line which is perpendicular to the arrangement of electric fields f1–f4 in the drawings, stands for an equipotential surface.

Figure 5:
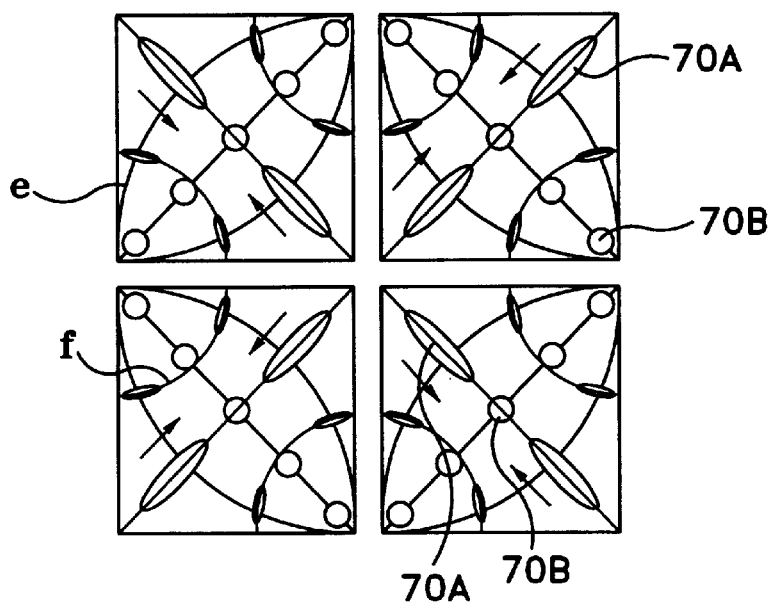
FIG. 5 is a drawing for showing LC molecules arrangement when electric field is formed in the electrodes of FIG. 4.

After forming the above described electric field, LC molecules are formed perpendicular to the equipotential surface "e" while long axes of the LC molecules 70A are arranged in parallel with the electric fields f1–f4 as shown in FIG. 5 thereby forming quadruple-domain in the LC layer 70. LC molecules 70B in the midway portion of the electric fields maintain their initial state, i.e. a homeotropically aligned state since the LC molecules 70B receives equal forces from the LC molecules 70A but in opposite directions. Consequently, the LC molecules 70B prevent the light leakage, a portion where the LC molecules 70B are arranged becomes a disclination line of the screen. This disclination line acts as a border of the respective LC molecules groups arranged in the same direction, i.e. domains.

Figure 6A:
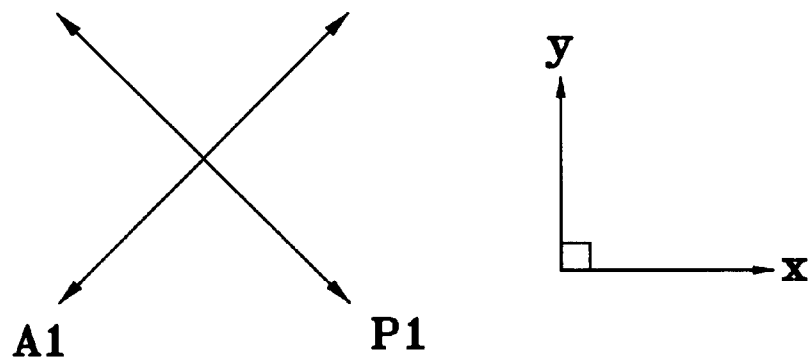
FIG. 6a is a drawing in which polarizing axes of polarizer and analyzer are arranged in the first state.

Herein, when the polarizing system is set in the first state as shown in FIG. 6a, since the direction of polarizing axis P1 is coincide with that of electric fields, therefore the transmittivity is almost zero in spite of the increase in voltage. (Refer to FIGS. 6b to 6d)

Figure 7A:
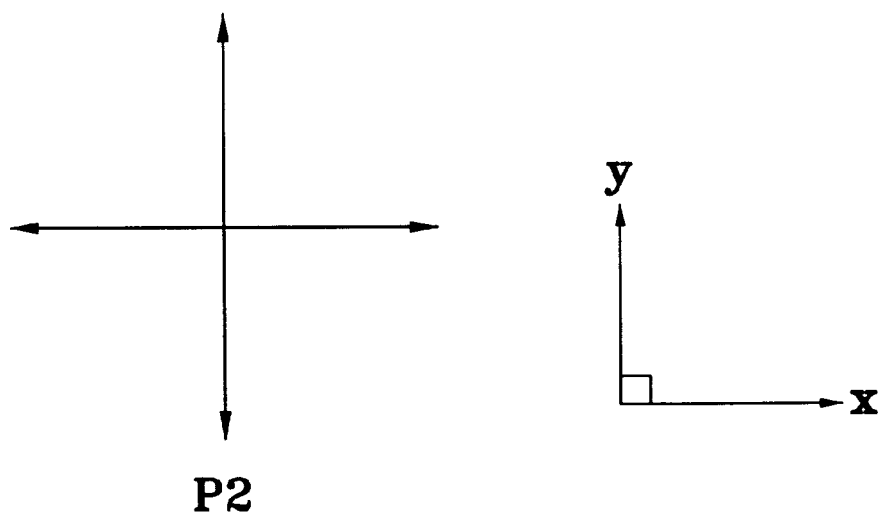
FIG. 7a is a drawing in which polarizing axes of polarizer and analyzer are arranged in the second state.

However, when the polarizing system is set in the second state as shown in FIG. 7a, since the angle between the polarizing axis P2 and the projection face of the electric fields f1–f4 becomes about ±45°, the maximum transmittivity is obtainable.

Referring to following equation 2, more detailed description will be discussed.

$$T \approx T_0 \sin^2(2\chi) \cdot \sin^2(\pi \cdot \Delta n d / \lambda) \qquad \text{equation 2}$$

wherein,

T indicates transmittivity, $T_0$ indicates transmittivity to reference light, $\chi$ indicates an angle between optical axes of liquid crystal molecules and the polarizing axes of polarizers, $\Delta n$ indicates refractive anisotropy, d indicates cell gap between the upper and the lower substrates, and $\lambda$ indicates wave of an incident light.

As known from the equation 2, the maximum transmittivity is obtained when the $\chi$ is $\pi/4$, i.e. 45°. In case of the first polarizing system, the polarizing axes P2 and A2 are coincide with the direction of electric fields f1–f4. Then, the $\chi$ becomes zero and consequently the transmittivity is zero.

Figure 6B:
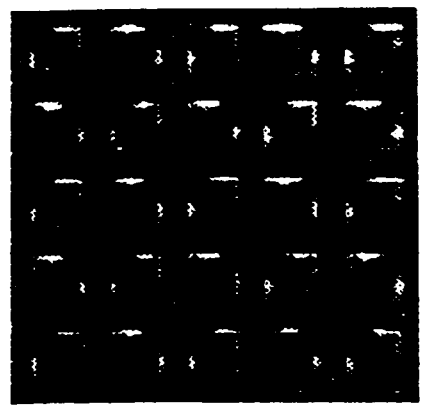
Figure 6C:
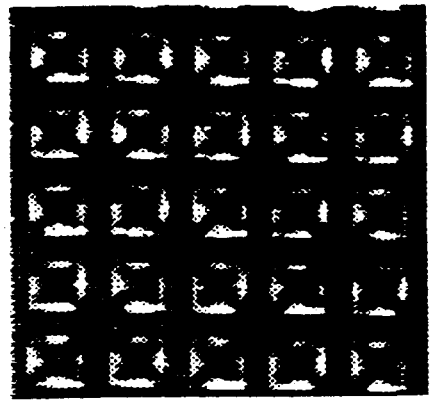
Figure 6D:
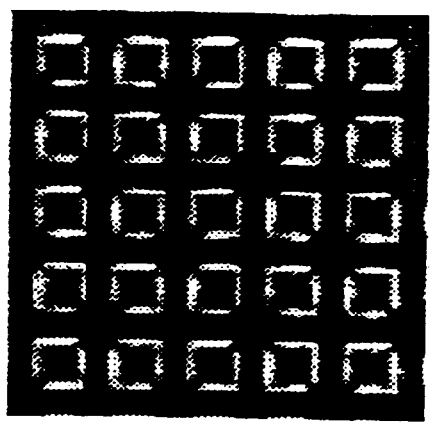

In this case, when the voltage is raised from 6V to 9V or 14V as shown in FIGS. 6b to 6d, the light leakage occurs while the transmittivity is lowered.

Figure 7B:
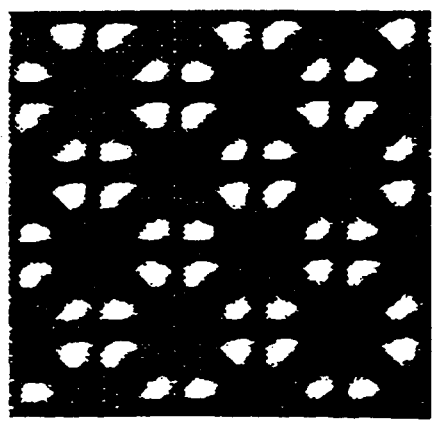
Figure 7C:
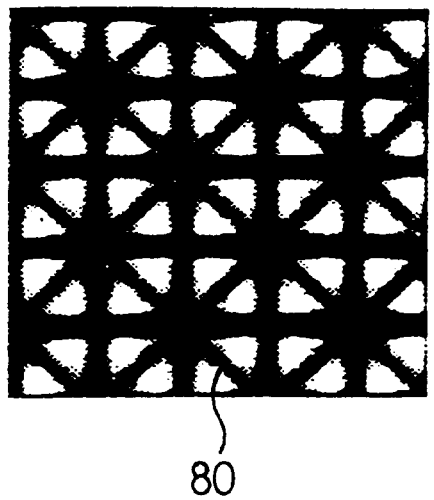
Figure 7D:
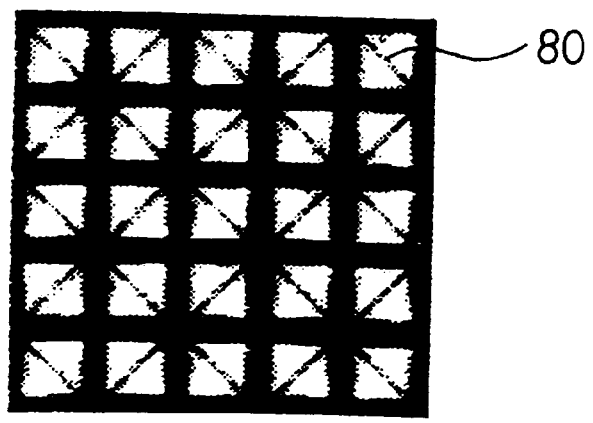

However, in case of the second polarizing system, the angle between the projection face of the electric fields f1–f4 and the polarizing axes P2 and A2 becomes 45°. As shown in FIG. 7b, a predetermined degree of transmittivity is obtained at voltage of 6V. More higher transmittivity is also obtainable when the voltage is 9V and 14 V as shown in FIGS. 7c to 7d. Accordingly, in the present embodiment, it is desirable that the arrangement of electrodes at the lower substrate is coincide with the direction of polarizing axes, i.e. the second polarizing system. The reference numeral 80 stands for the disclination line as described above. It is shown that the disclination line 80 decreases while the voltage increases.

In addition, the same effect is obtainable when the polarizing axis P of the polarizer is coincide with the y direction and the polarizing axis A of the analyzer is perpendicular to the polarizing axis of the polarizer. The LC molecules are set in an identical state with the first state and the second state in the absence of electric field, and the maximum transmittivity is obtainable since the angle between polarizing axis of the polarizer and the projection face of electric fields is 45° even in the presence of electric field.

Figure 8A:
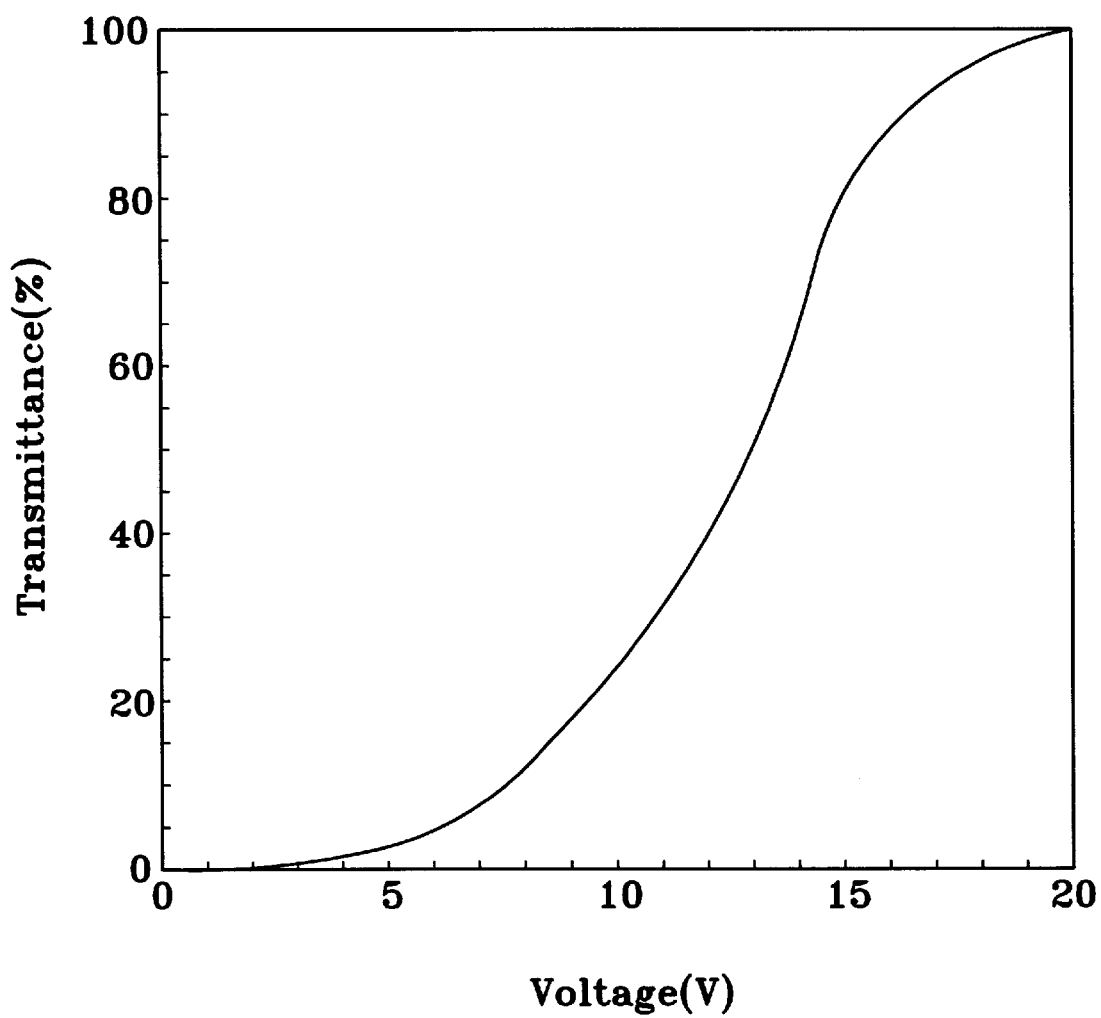
FIG. 8a is a transmittivity graph according to the voltage variation in the embodiment of the present invention.
Figure 8B:
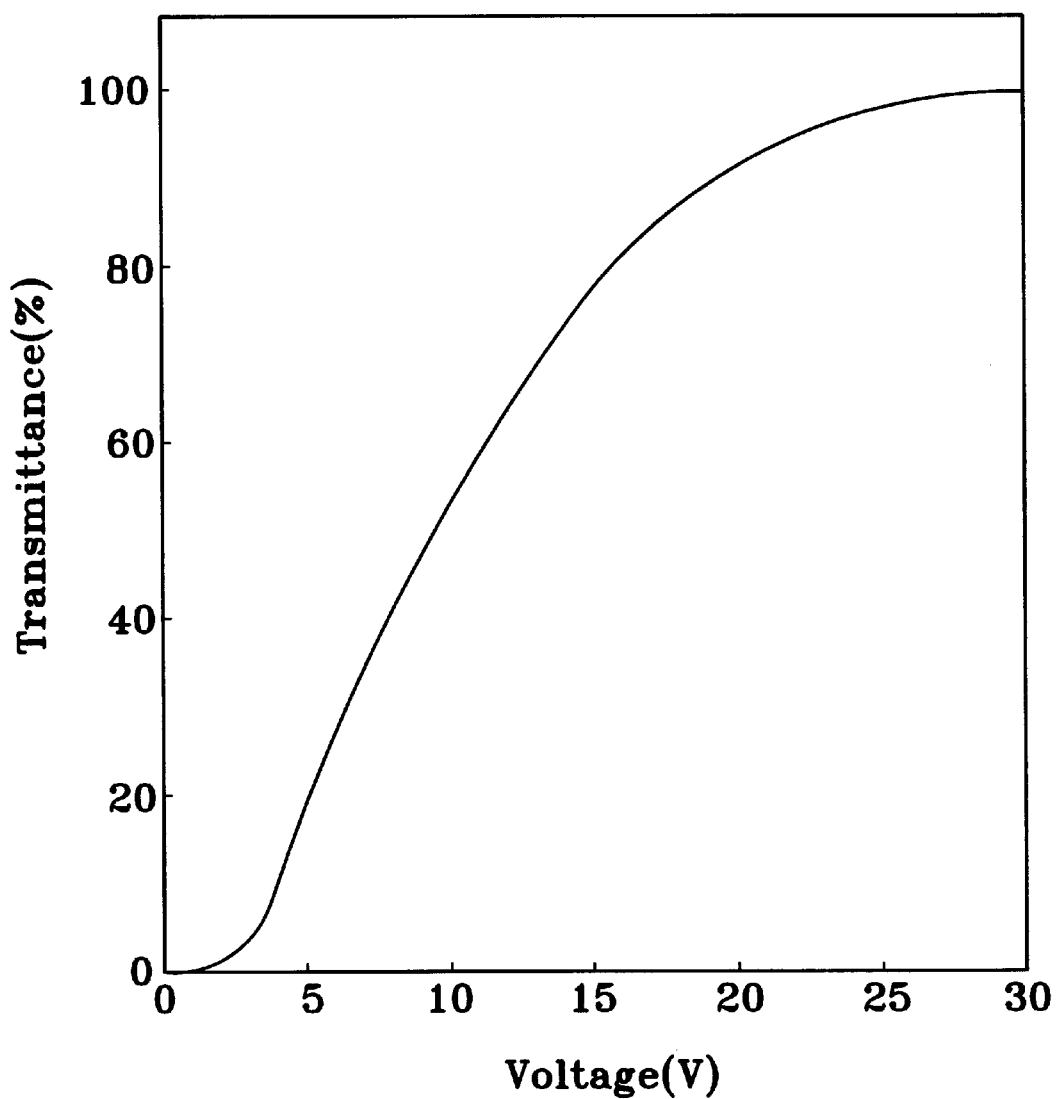
FIG. 8b is a transmittivity graph according to the voltage variation of the conventional LCD.

FIG. 8a is a transmittivity graph according to the voltage variation in the present embodiment. It is known from this graph that the transmittivity increases as the voltage increases, and the transmittivity reaches approximately 100% when the applied voltage is 20V. Under the identical conditions as above, the 100% transmittivity is also obtainable when the cell gap is enlarged to 60 $\mu$m at voltage of 30V or more. (Refer to FIG. 8b) Accordingly, reducing the cell gap is more advantageous for the operation under lower voltage condition rather than reducing the distances between the electrodes.

Figure 9:
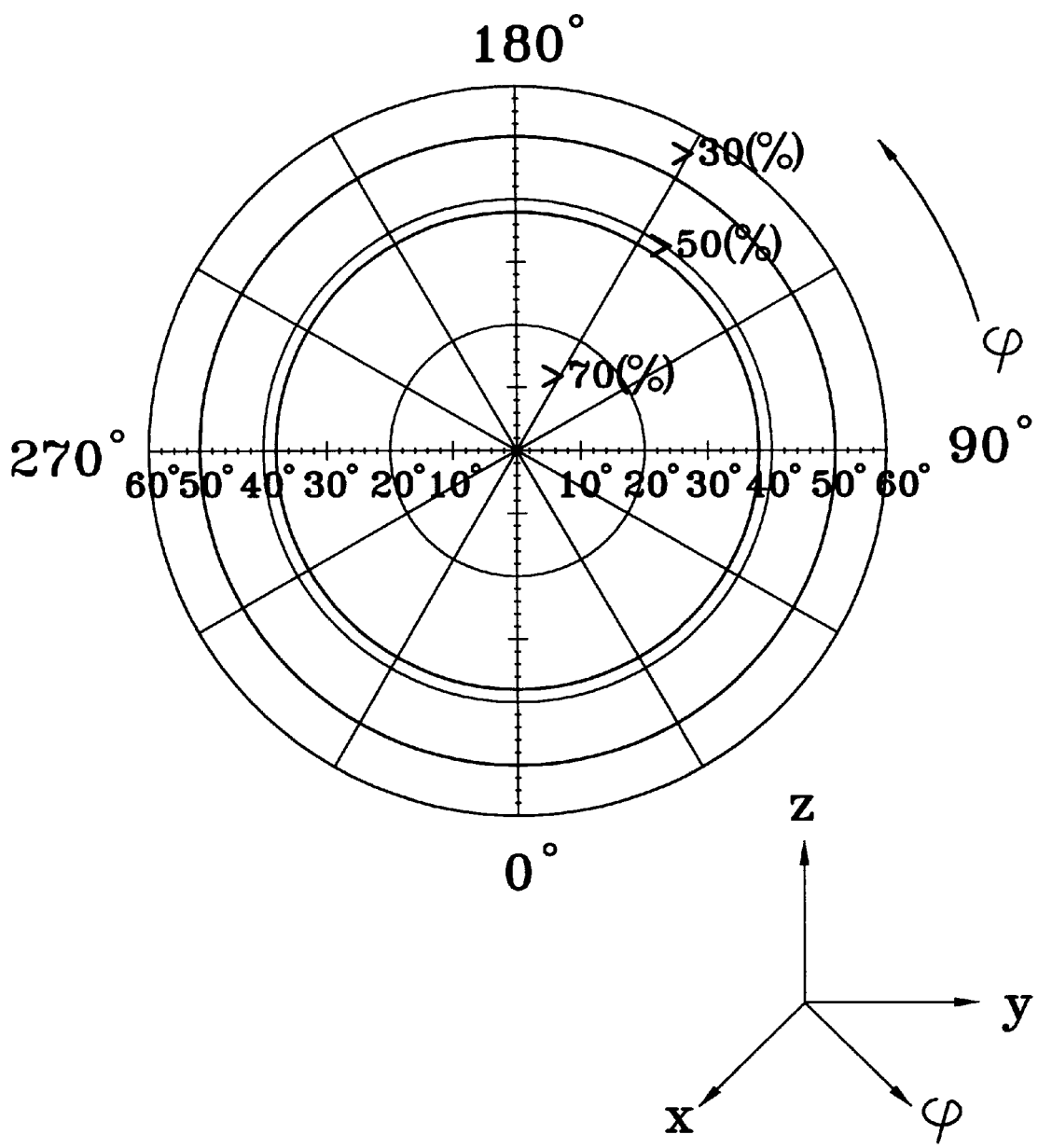
FIG. 9 is a graph showing brightness according to viewing angles in the embodiment of the present invention.

FIG. 9 is a graph showing a brightness according to viewing angles in the embodiments of the present invention. From the normal direction, a voltage of 20V is applied to the LCD. According to this graph, the brightness value at the central portion of the screen is 70% and the brightness at the entire screen is 30% or more. It is shown that the brightness characteristic is also improved.

Figure 10:
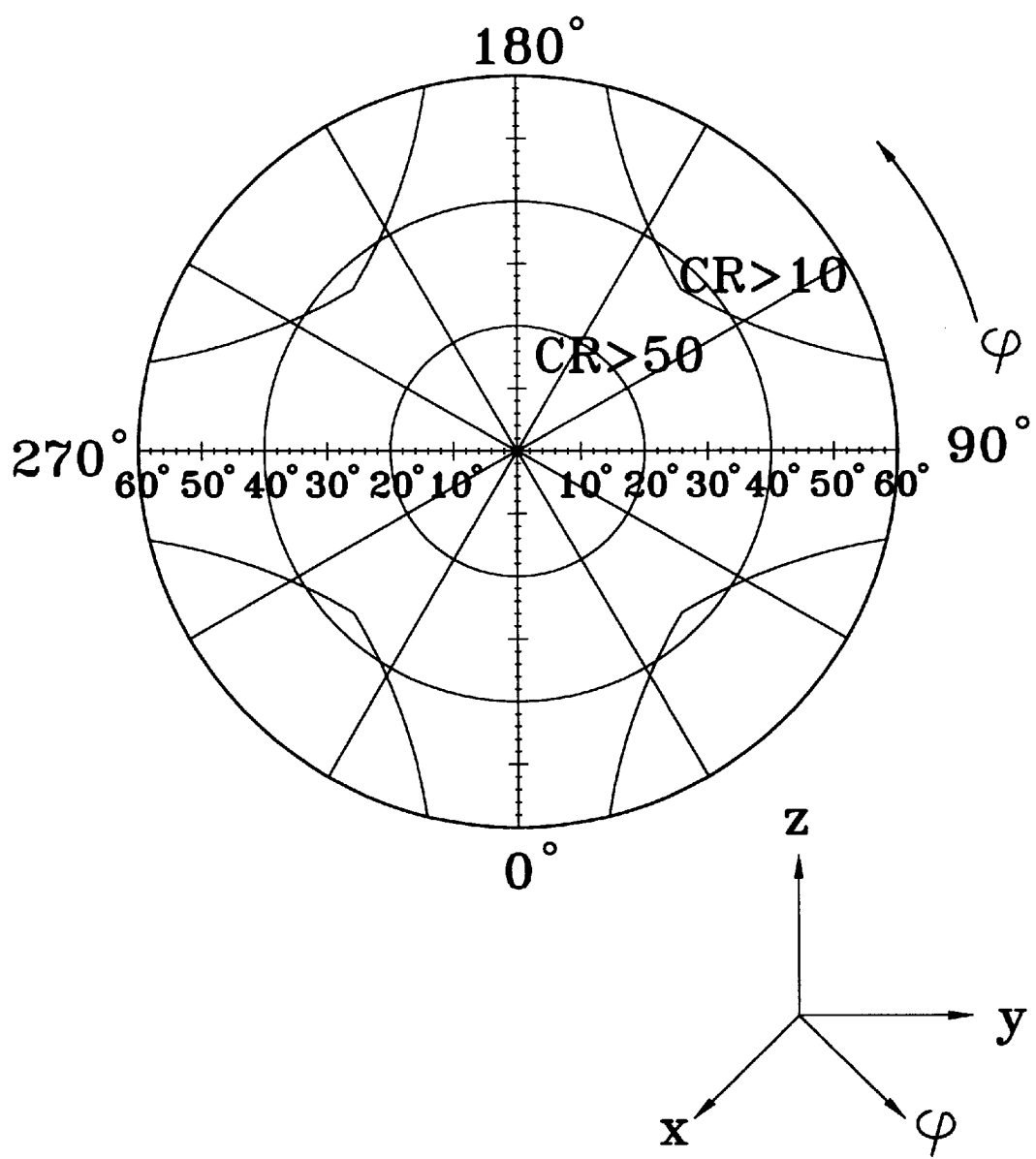
FIG. 10 is a graph showing an iso-contrast according to viewing angles in the embodiment of the present invention.

FIG. 10 is a graph showing an iso-contrast of viewing angle according to the present embodiment, and the iso-contrast ratio at the entire screen is over 10. In addition, since the polarizing axes are arranged in 90° and 180°, the electric fields are formed in the direction at 45°, 135°, 225° and 315°. Therefore, an excellent contrast ratio is obtained at 90°, 180°, 270° and 360° of the screen. In aspect of viewers, they generally views from 90°, 180°, 270° and 360° rather than at 45°, 135°, 225° and 315°. Accordingly, it is more advantageous to the viewers.

As described above, the electric fields are formed symmetric in all directions, and in each electric field, the LC molecules are arranged symmetrically based on the disclination line formed at the midway portion of the electric fields. Therefore a multi-domain is formed.(Refer to FIG. 5) To viewers, no color shift occurs at all points in the screen since long and short axes of LC molecules are seen simultaneously.

Since the electric field is formed between the electrodes 61,62 of the upper substrate 60 and the electrodes 51,52 of the lower substrate 50, the LC molecules 70a are arranged symmetrically, although the LCD is set obliquely.

Further, the cell gap in the present embodiment is very small, compared to conventional LCDs, and the cell gap changes not much in the oblique setting. This is also resulted in no color shift.

Further, the initial LC molecules 70A are arranged homeotropically and then they are tilted by the electric fields. Therefore, fast response time is obtained, compared to conventional LCDs in which the LC molecules are arranged being laid down.

In aspect of driving voltage, according to the equation 1, the cell gap D is smaller than the distances L1, L2 between the electrodes so that the operation under lower voltage condition is available.

As described above and according to the present invention, the first driving electrode and the second driving electrode are formed parallel each other at the lower substrate; the third driving electrode and the fourth driving electrode are formed parallel each other at the upper substrate in a direction which is substantially perpendicular to the first and the second electrodes; and the distances between the first electrode and the second electrode, and between the third electrode and the fourth electrode are smaller than the cell gap. In accordance with the arrangements, the electric fields are formed between the lower and the upper substrates rather than between the electrodes. Consequently, to viewers, no color shift occurs at all points in the screen since the LC molecules are arranged symmetrically under the presence of the electric fields.

Further, since the cell gap is very small and the electric fields are formed between the lower and the upper substrates in the oblique setting of LCD, which is also resulted in no color shift, fast response time and operation under lower voltage.

Various other modifications will be apparent to and can be readily made by those skilled in the art without departing from the scope and spirit of the present invention. Accordingly, it is not intended that the scope of the claims appended hereto be limited to the description as set forth herein, but rather that the claims be broadly construed.

What is claimed is:

1. A liquid crystal display of homeotropic alignment mode having a multi-domain comprising:

an upper and a lower substrates opposing each other with a selected cell gap;

a liquid crystal layer sandwiched between said substrates and composed of a plurality of liquid crystal molecules;

a first driving electrode and a second driving electrode both extended in parallel in a first direction and formed at inner surface of the lower substrate with a selected distance; and a third driving electrode and a fourth driving electrode both extended in parallel in a second direction which is substantially perpendicular to the first direction and both formed at inner surface of the upper substrate with a selected distance, wherein long axes of the liquid crystal molecules are arranged perpendicular to the substrates in the absence of electric field between the electrodes, and in the presence of electric field, the long axes of the liquid crystal molecules are tilted with respect to the center of the electric field so that the long axes of the liquid crystal molecules are arranged parallel to the electric field, wherein the cell gap is smaller than the distances between the first electrode and the second electrode and between the third electrode and the fourth electrode, and wherein an equivalent voltage is applied to the first and the third electrodes, however the voltage applied to the second and the fourth electrodes has voltage difference with the voltage applied to the first electrode.

2. The liquid crystal display as in claim 1, wherein the electric fields are formed at an intersection of the first driving electrode and the third driving electrode and at an intersection of the second driving electrode and the fourth driving electrode when voltage is applied to the liquid crystal display.

3. The liquid crystal display as in claim 1, wherein the liquid crystal has positive dielectric anisotropy.

4. The liquid crystal display as in claim 1, wherein homeotropic alignment layers are further provided at the inner surfaces of the upper substrate and lower substrate respectively.

5. The liquid crystal display as in claim 1, wherein a polarizer is further attached to the outer surface of the lower substrate and an analyzer is attached to the outer surface of the upper substrate, and polarizing axis of the polarizer is arranged perpendicular to that of the analyzer.

6. The liquid crystal display as in claim 5, wherein the polarizing axis coincides with a first direction or a second direction.

7. The liquid crystal display as in claim 6, wherein a phase compensation film is further provided between the polarizer and the upper substrate so that the liquid crystal molecules appear isotropic.

8. The liquid crystal display as in claim 7, wherein said phase compensation film is a polarizing material of negative refractive anisotropy, or is made of a cured film and the absolute value of phase retardation of the phase compensation film is equal to that of the liquid crystal layer.

9. The liquid crystal display as in claim 8, wherein the absolute value of phase retardation is set in the range of 0.2–0.6 µm.

10. The liquid crystal display as in claim 1, wherein the cell gap is set in the range of 3–10 µm, and the distances between the first electrode and the second electrode, also between the third electrode and the fourth electrode are set in the range of 5–20 µm.

11. The liquid crystal display as in claim 1, wherein the widths of the respective electrodes are set in the range of 3–10 µm.

12. A liquid crystal display of homeotropic alignment mode having a multi-domain comprising:

an upper and lower substrate opposing each other with a selected cell gap and defining a plurality of pixel areas opposing each other;

a liquid crystal layer sandwiched between the substrates and composed of a plurality of liquid crystal molecules;

a first driving electrode and a second driving electrode both formed at each unit pixel of the lower substrate with a selected distance in an alternative manner and extended in parallel in a first direction;

a third driving electrode and a fourth driving electrode both formed at each unit pixel of the upper substrate with a selected distance and extended in parallel in a second direction which is substantially perpendicular to the first direction;

homeotropic alignment layers formed at the inner surfaces of the lower substrate and the upper substrate respectively;

a polarizer with polarizing axis formed at the outer surface of the lower substrate;

an analyzer with polarizing axis which is substantially perpendicular to the polarizing axis of the polarizer, formed at the outer surface of the upper substrate; and a phase compensation film to display the liquid crystal molecules to appear isotropic and sandwiched between the upper substrate and the analyzer, wherein, an equivalent voltage is applied to the first and the third electrodes, however, the voltage applied to the second and the fourth electrodes has voltage difference with the voltage applied to the first electrode, wherein, the cell gap is smaller than the distances between the first electrode and the second electrode and between the third electrode and the fourth electrode thereby generating electric fields between an intersection of the first and third electrodes, and an intersection of the second and fourth electrodes, and wherein, the polarizing axis of the polarizer coincides with said first direction or said second direction.

13. The liquid crystal display as in claim 12, wherein the liquid crystal has positive dielectric anisotropy.

14. The liquid crystal display as in claim 12, wherein said phase compensation film is a polarizing material of negative refractive anisotropy and the absolute value of phase retardation of the phase compensation film is equal to that of the liquid crystal layer.

15. The liquid crystal display as in claim 12, wherein the absolute value of phase retardation is set in the range of 0.2–0.6 µm.

16. The liquid crystal display as in claim 12, wherein the cell gap is set in the range of 3–10 µm, and the distances between the first electrode and the second electrode, also between the third electrode and the fourth electrode are set in the range of 5–20 µm.

17. The liquid crystal display as in claim 12, wherein the widths of the respective electrodes are set in the range of 3–10 µm.

* * * * *